United States Patent
Srinivasan

(10) Patent No.: US 8,214,553 B2
(45) Date of Patent: Jul. 3, 2012

(54) VIRTUALIZATION OF AN INPUT/OUTPUT DEVICE FOR SUPPORTING MULTIPLE HOSTS AND FUNCTIONS

(75) Inventor: Arvind Srinivasan, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 206 days.

(21) Appl. No.: 12/697,953

(22) Filed: Feb. 1, 2010

(65) Prior Publication Data

US 2011/0191506 A1 Aug. 4, 2011

(51) Int. Cl.
G06F 3/00 (2006.01)
G06F 13/28 (2006.01)
G06F 5/00 (2006.01)
(52) U.S. Cl. .................. 710/22; 710/8; 710/36
(58) Field of Classification Search .......... 710/8, 22, 710/36
See application file for complete search history.

(56) References Cited

U.S. PATENT DOCUMENTS

| 7,502,884 B1* | 3/2009 | Shah et al. ............ 710/316 |
| 2009/0089464 A1* | 4/2009 | Lach et al. ............ 710/62 |
| 2009/0100297 A1* | 4/2009 | Srinivasan et al. ........ 714/43 |
| 2009/0113082 A1* | 4/2009 | Adar et al. ............ 710/15 |
| 2009/0304022 A1* | 12/2009 | Yang et al. ............ 370/463 |
| 2010/0030923 A1* | 2/2010 | Frazier et al. .......... 710/11 |
| 2011/0072172 A1* | 3/2011 | Rodrigues et al. ........ 710/52 |

* cited by examiner

*Primary Examiner* — Henry Tsai
*Assistant Examiner* — Kris Rhu
(74) *Attorney, Agent, or Firm* — Park, Vaughan, Fleming & Dowler LLP

(57) ABSTRACT

Methods and apparatus are provided for simultaneously supporting multiple hosts with a single communication port; each host may host multiple functions. The input/output device comprises multiple buffers; each buffer stores packets for one host, but can be dynamically reallocated to a different host. Multiple buffers may simultaneously support the same host and all of its functions. After a packet is received and classified, it is stored in at least one buffer, along with control information for processing the packet upon egress from the buffer. Egress managers for each buffer extract packets and transfer them to destination host/functions, by speculatively moving the packets forward even while DMA engines perform their processing to facilitate their transfer.

18 Claims, 4 Drawing Sheets

VIRTUALIZATION OF AN INPUT/OUTPUT DEVICE FOR SUPPORTING MULTIPLE HOSTS AND FUNCTIONS

BACKGROUND

This invention relates to the field of computers. More particularly, apparatus and methods are provided for virtualizing an input/output device to allow multiple hosts and functions to share a single port of the device.

Virtualized I/O devices provide considerable value because they allow a high-performance peripheral component to be shared among multiple applications, making it seem as if each application is receiving a separate, dedicated I/O device. From an application's perspective, each virtual device is completely isolated, and the device driver associated with each virtual device is unaware of the existence of any other. By isolating each virtual device's data from all other virtual devices, data privacy and integrity can be assured.

Peripheral Component Interconnect Express (PCIe) is a very widely used, standardized, computer system I/O technology. PCIe includes a virtualization model in which a Function operating on a host provides hardware traffic isolation and protection, as well as a standardized interface. Via this standard interface, system software can configure and manage anything from a monolithic input/output device supporting a single Function to a high-throughput input/output device supporting hundreds of virtual Functions.

Sharing of one physical input/output port among multiple Functions through virtualization, especially among multiple Functions hosted by different hosts, has not been successfully implemented because it presents several challenges. Among those challenges are isolating the hosts and Functions (even in the presence of errors), handling packets destined for multiple Functions (e.g., broadcast packets), supporting different data throughput rates for different hosts, and so on.

Thus, apparatus and methods are needed to simultaneously support multiple hosts and multiple Functions on each host via a single input/output port, without allowing one host or Function to block another host or Function.

SUMMARY

In some embodiments of the invention, apparatus and methods are provided for allowing multiple hosts, and multiple functions residing on those hosts, to share one physical port of an input/output device.

In these embodiments, two levels of virtualization are implemented. On one level, the input/output port (e.g., one port of a network interface circuit) simultaneously supports multiple host entities (e.g., PCIe root complexes), allowing each host to act as if it has use of a dedicated device. On a second level, the port simultaneously serves multiple Functions on one or more of the host entities.

The input/output device comprises multiple buffers; each buffer stores packets for any number of functions operating on one host, and can be dynamically reallocated from one host to another. Multiple buffers may simultaneously support the same host and its functions. The device also comprises ingress managers for managing storage of packets within buffers, egress managers for initiating transfer of packets from a buffer to its destination host/functions, and logical bus interfaces for forwarding the packets to their destinations.

Each cooperative combination of one buffer, supporting ingress managers, an egress manager and a bus interface may herein be collectively termed a "host assembly," and the input/output device may comprise any number of such host assemblies.

After a packet is received and classified, it is distributed to each buffer's ingress managers. Within a set of ingress managers serving one buffer, each manager corresponds to one function of the buffer's corresponding host, and is programmed with criteria for identifying packets accepted or desired by that function. A copy of the packet is stored in a buffer if at least one of the buffer's ingress managers accepts it. Control information for processing the packet upon egress from the buffer is also stored in the buffer for each packet.

Egress managers for each buffer extract packets and speculatively move them via a pipeline to logical bus interfaces for transfer to destination functions. Associated DMA (Direct Memory Access) engines determine whether or not to proceed with each packet and, if so, identify destination host memory addresses. The pipeline comprises separate structures for storing packets and for storing control information for facilitating transfer of the packets to their destinations. The egress manager is also responsible for replicating a packet destined for multiple functions on one host (e.g., a multicast or broadcast packet).

Transfer of a packet may be aborted by the device (e.g., if a memory error is detected) or by the receiving host (e.g., if a destination function is reset or otherwise unavailable). Errors or delays in transferring a packet to a host/function will not block other hosts and functions from receiving the same packet and/or other packets.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, apparatus and methods are provided for virtualizing a physical port of an input/output device to support multiple hosts and one or more functions on each host.

In some specific implementations, the input/output device is a network interface circuit (NIC), each host comprises a PCIe (Peripheral Component Interconnect Express) root complex and the functions are PCIe functions. Other implementations and embodiments may be readily derived from the following description for environments comprising other types of devices, hosts and communication protocols/architectures.

Figure 1:
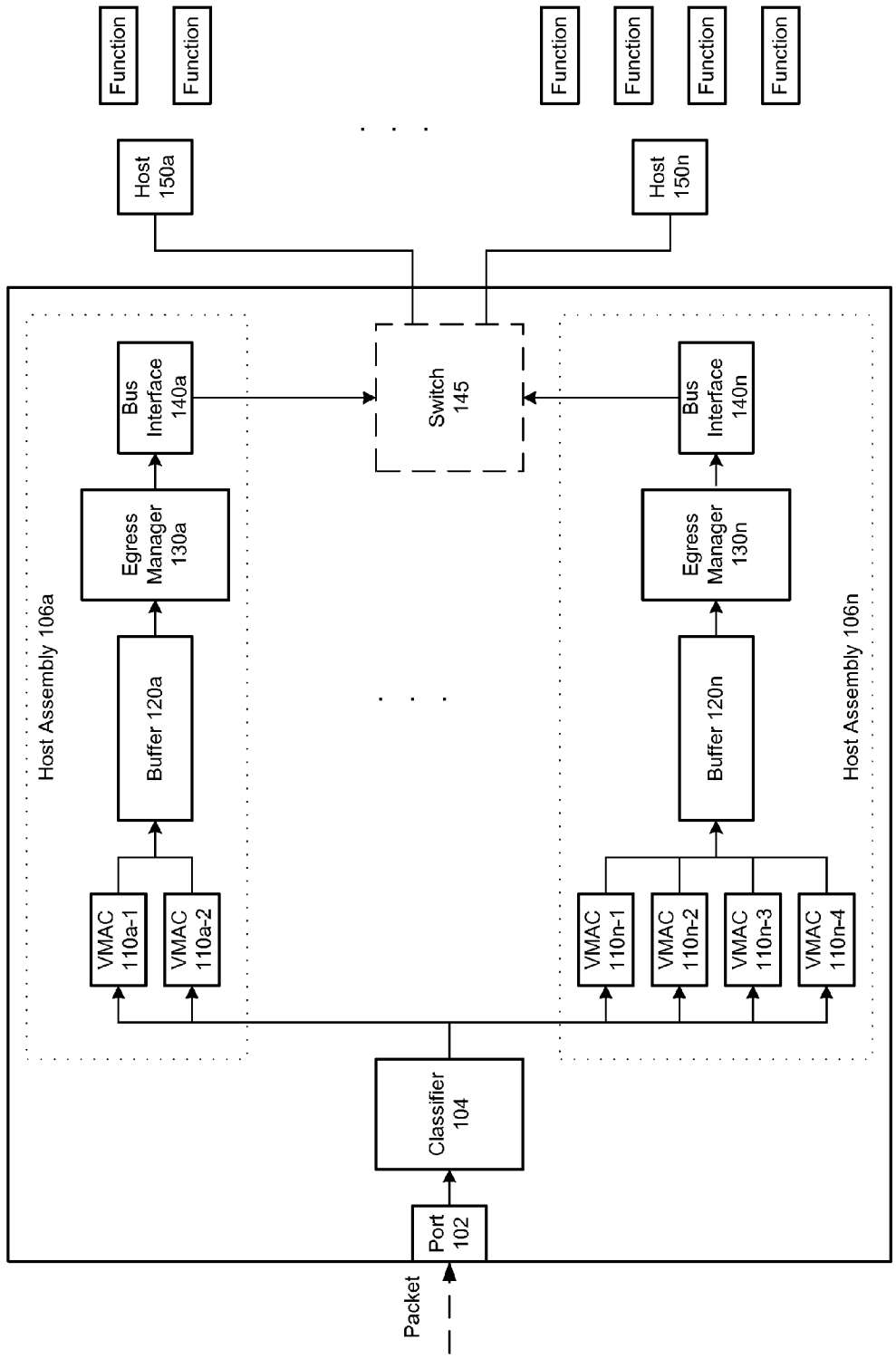
FIG. 1 is a block diagram of a network interface device with which some embodiments of the present invention may be implemented.

FIG. 1 is a block diagram of a network interface device with which some embodiments of the present invention may be implemented. Although FIG. 1 depicts only a single port of the device being virtualized to support multiple hosts and functions, multiple ports of the same device may be simultaneously virtualized in the same manner.

Network interface device 100 of FIG. 1 comprises port 102, classifier 104, one or more host assemblies 106 and optional switch 145. Each host assembly comprises at least one virtual MAC (Medium Access Control modules) 110, packet buffer 120, egress manager 130 and bus interface 140.

The device may be coupled to any number of hosts 150, each of which may host any number of functions. Other components of the network interface device are omitted in the interest of clarity. The network interface device may be implemented as part of a single semiconductor chip.

Port 102 is coupled to a data link and receives (and transmits) communications (e.g., packets, datagrams, cells) on behalf of the hosts and functions it supports. Classifier 104 is configured to classify incoming communications, and may operate to identify one or more destinations (e.g., hosts, functions) for each communication, and/or one or more DMA (Direct Memory Access) engines or other components for transferring the communication to its destination(s).

For example, the classifier may comprise multiple classification tables configured to select a packet's destination function(s) based on its destination address and/or other information gleaned from the packet, and/or select one or more DMA engines for transferring the packet to those functions.

Illustrative methods of managing a classification apparatus to support multiple host functions are described in U.S. patent application Ser. No. 12/633,926, entitled Apparatus and Method for Managing Packet Classification Tables, which was filed Dec. 9, 2009 and is incorporated herein by reference.

Virtual MACs (VMACs) 110 are configured to filter communications, for storage in buffers 120, based on how they have been classified and/or inherent characteristics or attributes of the communications. Buffers 120, which may be implemented as FIFO (First-In, First-Out) queues, are configured to store communications for transfer to their destination hosts and functions, and may be of any suitable size (e.g., 16K, 32K, 64K).

An egress manager 130, which comprises DMA engines and other components, is configured to transfer packet data from a packet buffer to a host 150 via a corresponding logical bus interface 140 and switch (or other comparable communication component) 145. An illustrative egress manager is described in more detail below, with reference to FIG. 2.

Logical bus interfaces 140 comprise physical hardware modules that can be dynamically allocated to different hosts (i.e., whichever host the corresponding buffer 120 is allocated to). Switch 145 may be a multi-root aware switch in the illustrated embodiment of the invention, but in other embodiments may be replaced by other elements capable of preparing a packet or other communication for delivery to a host.

Each host comprises an independent PCIe root complex and an associated I/O memory subsystem, and may host any number of physical and/or virtual functions. Thus, in the illustrative environment of FIG. 1, host 150a hosts two functions, while host 150n hosts four. In this environment, hosts may be implemented as separate blades (or other types of computer processor components) installable in one server or enclosure.

Different hosts may be coupled to device 100 via links of different capacities or speeds (e.g., ×1, ×8), and therefore may exhibit different memory latency patterns. Different hosts may also process incoming packets at different rates, based on their processor configurations, application loads and/or other factors.

In the embodiments of the invention depicted in FIG. 1, each host assembly 106 serves a different host 150, and is supported by one VMAC 110 for each function operating on that host. Thus, in FIG. 1, buffer 120a of host assembly 106a is served by VMACs 110a-1 and 110a-2. Buffer 120n of host assembly 106n is served by VMACs 110n-1, 110n-2, 110n-3 and 110n-4. Each VMAC is dynamically programmable to accept or reject packets meeting specified filtering criteria.

The VMACs may be programmed by their corresponding functions and/or other supervisor entity (e.g., a service processor). The supervisor may also be responsible for instantiating, enabling, disabling, reassigning, terminating or otherwise manipulating VMACs (e.g., when a function is reset, when a new function is initialized, when a new host is coupled to the network interface device, when a host is detached).

After a packet is classified by classifier 104, and if it is not to be dropped, it may be distributed to every VMAC 110 or to some subset of all VMACs. Each VMAC that receives the packet applies its filtering criteria to decide whether to accept the packet into the associated buffer 120 on behalf of its corresponding function.

If at least one VMAC coupled to a given buffer accepts it, the packet is stored in the buffer. Because the packet may be destined for multiple different hosts (e.g., multiple functions operating on different hosts), it may be accepted by VMACs serving different buffers, and may therefore be stored in more than one buffer 120.

Specifically, for host assembly 106a, a packet that is received from classifier 104 and that matches the programmed criteria of either or both VMAC 110a-1 and VMAC 110a-2, is stored in buffer 120a. Similarly, if the packet survives the filtering rules of any of VMACs 110n-1, 110n-2, 110n-3 or 110n-4, it will be stored in buffer 120n of host assembly 106n.

In some implementations, a given VMAC outputs a signal indicating whether to accept a packet based on its programmed filtering criteria. That signal may be OR'd or otherwise combined with signals from its sibling VMACs (i.e., other VMACs feeding the same buffer) to yield a final accept/reject signal for the packet for the supported buffer.

Even if a packet is destined for multiple functions operating on one host, the buffer serving that host may store only a single copy of the packet, along with information identifying its destinations. Upon egress from the buffer, however, multiple copies of the packet may be issued—one for each function. Alternatively, multiple copies of the packet may be stored in the buffer, and coded for different destinations.

In some embodiments of the invention, a VMAC 110 filters packet data based on the DMA engine(s) for which the packets were classified (e.g., by classifier 104). Specifically, one or more DMA engines within network interface device 100 are bound to each function supported by the device, and each buffer 120 is supported by a different set of DMA engines (e.g., as part of egress manager 130). Each VMAC is also associated with a single function, and therefore can be programmed to accept packets classified for the DMA engine(s) bound to its function. A VMAC may reject packets not classified for the DMA engine(s) bound to its function.

In some embodiments, a VMAC may also (or instead) be programmed to accept or reject a packet based on one or more characteristics other than its classification, such as the presence or absence of errors (e.g., checksum, CRC), its size (e.g., jumbo or non-jumbo), any protocol options, etc.

For example, when a function enters promiscuous mode, a corresponding VMAC may be programmed to accept all packets, regardless of classification and characteristics. Yet another function may enter promiscuous mode, but not want to see packets that have errors; a corresponding VMAC will therefore be programmed to accept all packets except those with errors.

Yet another VMAC may be programmed to reject all packets with checksum errors (e.g., even if they are classified for the function). Another VMAC may be programmed to accept all packets having CRC errors, regardless of classification, and so on.

Thus, VMACs may filter packets based on their classification (e.g., DMA engine(s)) and/or inherent characteristics of the packets. Because each supported function is served by its own set of VMACs, which can be programmed with any desired permutation of packet characteristics, the function has very fine-grained control over the packets it will receive. In addition, because each function's filtering criteria is applied independently, one VMAC's rejection of a packet based on its function's criteria will not block any other function from receiving the packet.

Virtual MACs 110 can be dynamically instantiated, destroyed, programmed and reprogrammed by a supervisor entity (e.g., a service processor) that also allocates or binds them to specific physical and/or virtual functions, such as when a host assembly is reassigned to support a different host, or when there is a change in the configuration of the functions operating on one host. A VMAC's bind data identifies the DMA engine(s) bound to its corresponding function, and identifies the criteria to be used to filter packets for the function.

In an illustrative embodiment of the invention, the chip or other circuitry comprising network interface device 100 comprises twelve buffers 120 and associated components (i.e., egress manager 130 and logical bus interface 140). The term "host assembly" may be used to encompass each group of these components, along with the VMACs that filter packets for storage in the buffer.

The device may therefore be simultaneously coupled to any number of hosts from one to twelve, inclusive. Also in this embodiment, each host assembly comprises or is allocated up to four DMA engines (e.g., as part of its egress manager 130) for transferring packets to the connected host.

Because any host assembly may be used to support any of multiple different hosts, each assembly's bus interface 140 is configurable to support any host to which device 100 may be coupled.

In implementations of this embodiment in which each host assembly is coupled to and supports a separate host, as in FIG. 1, a host may sustain up to four functions. For example, each function within host 150n would be allocated one DMA engine, while DMA engines supporting host 150a may be divided two and two or three and one between the two functions.

In other embodiments of the invention, however, multiple host assemblies may be coupled to the same host, thereby allowing that host to use more than four DMA engines and support more than four functions. For example, if host 150a were to shut down, then host assembly 106a could be reassigned to support host 150n. In some circumstances (e.g., with a slow host), multiple host assemblies may be allocated to a single host in order to avoid undesired dropping of packets.

Just as VMACs 110 have bind data that identifies the DMA engine(s) bound to the VMACs' corresponding packet buffer, and that is used to identify packets to accept for those functions, egress managers 130 have associated bind data to identify and locate the hosts they support. Illustratively, each egress manager comprises one or more DMA engines, and each DMA engine is bound to a single function on the supported host.

In embodiments of the invention depicted in FIG. 1, when a packet is stored in a buffer 120, a control header is stored in the same buffer in conjunction with the packet. The control header is formed by the VMAC or VMACs that voted to accept the packet, and is configured to identify the packet's destination(s) (e.g., host/function), why it is being transferred to a host/function, how to transfer the packet from the network interface device (e.g., which DMA engine or engines to use) and/or other information regarding how to process the packet when it is removed from the buffer.

For example, the control header may store attributes of the packet as well as classification attributes produced by a classifier, and may therefore include information such as packet size, presence of errors, which DMA engine(s) the packet was classified for, destination address, a hash computed by hardware (e.g., so that software can use the same hash instead of re-computing it), an indication that promiscuous mode was active, etc. This information may be passed to a destination function so that it can determine why it received the packet (e.g., based on classification, based on packet characteristic, because the function was in promiscuous mode).

In some embodiments of the invention, control headers (or data for generating control headers) may be pre-configured (e.g., by functions) and stored with the VMACs. As the VMACs accept packets, they output the pre-configured data to produce corresponding control headers for insertion in the packet buffer (e.g., ahead of the packet).

In a scenario in which multiple VMACs serving one buffer accept a packet on behalf of different functions, one collective control header may be produced and stored in the buffer with one copy of the packet. The control header will include all information necessary to replicate the packet data (e.g., once for each destination function) upon egress from the buffer.

One of ordinary skill in the art will appreciate that in a traditional network interface device, separate buffers would likely be implemented for packet data and for control information. In embodiments of the present invention such as those illustrated in FIG. 1, a single host assembly and its constituent buffer can support multiple functions and store both data and control information. By accompanying each packet with a specific control header, associations between packets and control headers are more easily managed upon egress from the buffer.

When a function is reset (e.g., through a function level reset) or otherwise becomes unresponsive, VMACs associated with that function may be disabled to prevent the queuing of packets for the function. Detection of function errors that require this action, as well as the subsequent disabling of one or more VMACs may be performed by a service processor or other supervisory entity.

FIG. 1 thus illustrates embodiments of the invention in which multiple hosts and multiple functions on those hosts share a single physical network port. A network interface device such as device 100 comprises multiple host assemblies, each of which may be dynamically allocated to different hosts at different times. Although each host assembly may support only one host at a given time, multiple host assemblies may serve the same host simultaneously.

In the illustrated embodiments, the output of a packet classifier is delivered to each host assembly's ingress management entities. The ingress manager or managers serving one buffer include at least one virtual MAC for each function in the host supported by that buffer, and operate to control the flow of packet data into the buffer based on programmed filter criteria.

Each buffer is also served by one or more egress management entities for transferring packets to destination hosts and functions. The egress managers consume control information associated with each packet to determine where to send the packet data, and deliver packets to logical bus interfaces that forward the packets to their destinations.

Each bus interface is configured to support whichever host its host assembly is currently serving. The bus interface may be reconfigured or reprogrammed to support different physical media and protocols as the host assembly is reallocated to different host entities.

U.S. Pat. No. 7,500,046, which issued Mar. 3, 2009 and is entitled "Abstracted Host Bus Interface for Complex High Performance ASICs", describes an interface for coupling a device such as network interface device 100 to different types of host buses.

Figure 2:
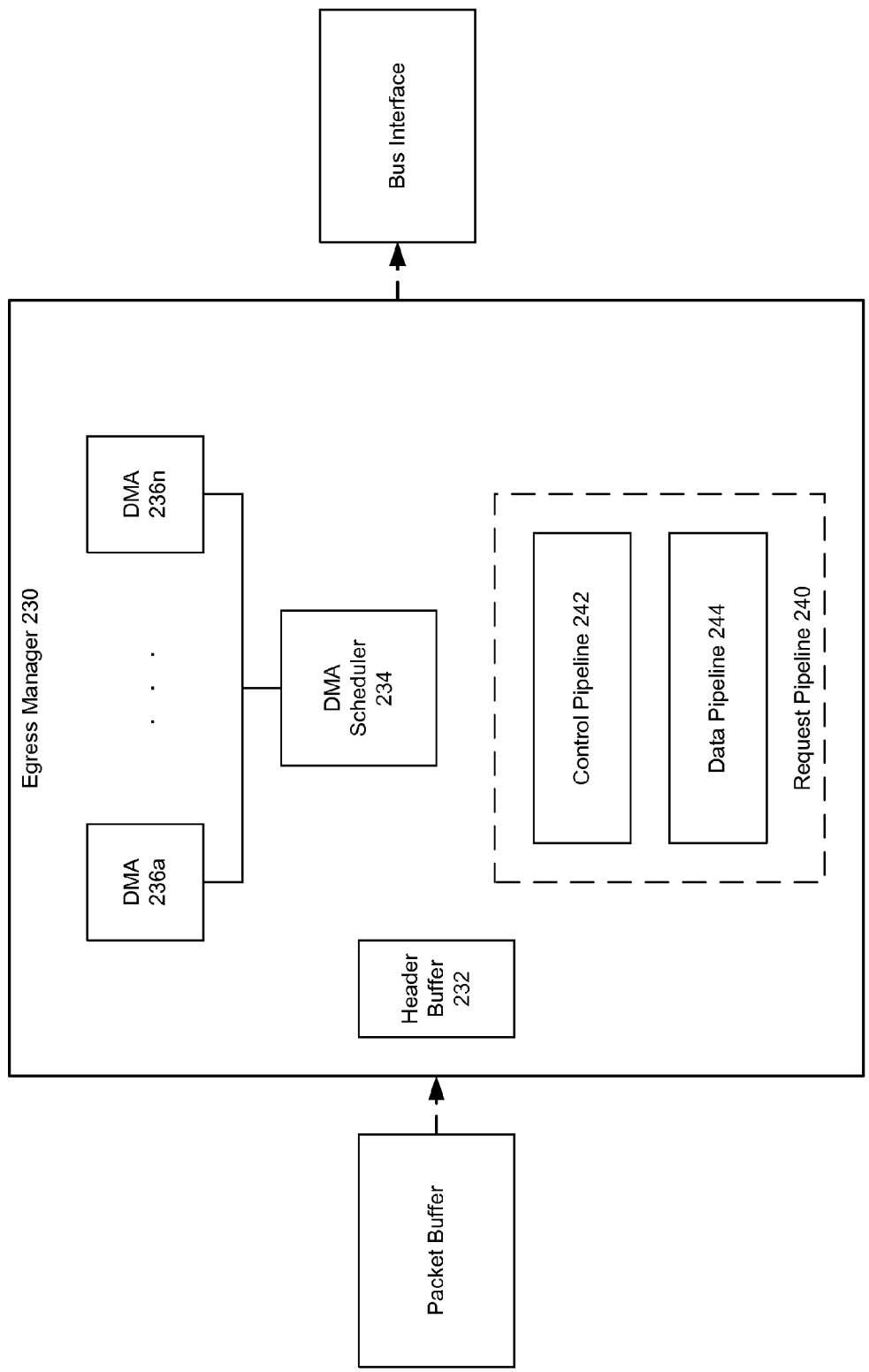
FIG. 2 is a block diagram of an egress manager for facilitating virtualization of a port of a network interface device, in accordance with some embodiments of the invention.

FIG. 2 is a block diagram of an egress manager of a communication device having one or more virtualized communication ports, according to some embodiments of the invention. As described above, egress manager 230 receives packets from a packet buffer and facilitates their transfer to hosts via corresponding logical bus interfaces.

In the embodiments of the invention represented in FIG. 2, egress manager 230 comprises header buffer 232, DMA scheduler 234, DMA engines 236 and request pipeline 240. Request pipeline 240 includes two components—control pipeline 242 and data pipeline 244. In other embodiments, an egress manager may comprise additional components.

Header buffer 232 is configured to temporarily store a control header received from the packet buffer. As described previously, a control header accompanies each packet placed into the buffer, and contains information the egress manager can use to help move the packet. A packet's control header may be copied to header buffer 232 for examination before or while the packet is extracted from the packet buffer.

DMA scheduler 234 distributes a control header (from header buffer 232) to all DMAs 236, to allow them to begin their work to identify a host buffer for storing the packet, to identify a destination address, calculate how many buffers are needed, fetch a descriptor, determine packet attributes, etc. The control header may be configured to identify the DMAs that must act on the packet (i.e., those DMAs bound to functions for which the packet is destined).

Each DMA may use the control header to make an initial decision as to whether or not to drop the corresponding packet. For example, if no host buffers are available for a given DMA, it may quickly signal that it cannot handle the packet.

While a control header is being processed by one or more DMAs, the corresponding packet is copied to data pipeline 244. As the DMAs complete their work, they populate control pipeline 242 with control information to assist the packet's transfer to a host via host interface logic (e.g., the bus interface).

Thus, even before it is certain that a packet within the packet buffer will be transferred to a host, or before details of the transfer can be calculated, the packet may be speculatively moved into the data pipeline. The size of the pipelines may be determined by some measure of the latency (e.g., maximum, average) of the DMA engines.

The latency experienced by the DMA engines is compensated for by the speculative movement forward of the data packets. By preemptively placing the packets into position for transfer to the host, they are available for processing as soon as the DMA engines provide the necessary control information. Depending on the width of pipeline 240, multiple packets may be able to be presented to the host interface logic simultaneously.

Pipeline 240 is able to operate at, or close to, the native speed of the communication bus. For example, a port operating at 40 Gb/sec could receive Ethernet packets of minimum size every 16 nanoseconds. The speculative manner in which data packets are moved through egress manager 230 allows packets to be transferred to a host with that same periodicity, even if the DMA engines require more than 16 nanoseconds to process a given packet.

One aspect of some embodiments of the invention that supports processing packets at high speed involves merging requests with the data represented by the requests. For example, when egress manager 230 issues a request to a bus interface to accept a data transfer, it forwards the data with the request. This eliminates the need to idle the egress manager while it awaits an acknowledgement of the request from the interface.

Control headers may be passed to the header buffer in the same manner. That is, the buffer may transmit the control header along with a request to the egress manager (e.g., the DMA scheduler) to accept the header.

The pipeline is able to run at a reduced clock frequency and still support full utilization of the communication link. In addition, the pipeline can easily scale or be upgraded to support devices having throughputs higher than 40 Gb/sec.

The split nature of pipeline 240 also provides separation between the data path and the DMAs. Thus, the DMA engines could be located external to a chip comprising the host assembly that includes egress manager 230.

Figure 3:
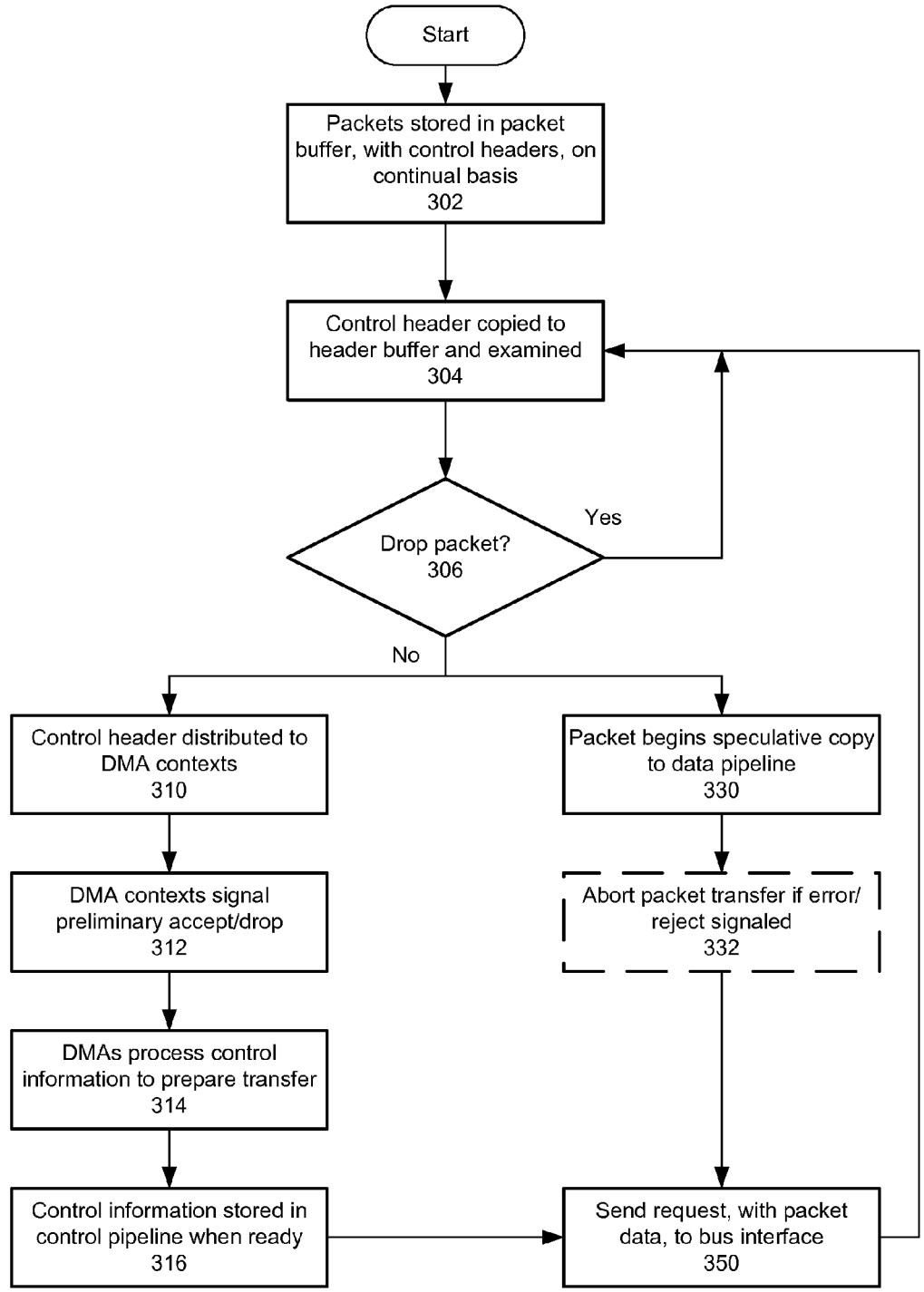
FIG. 3 is a flow chart demonstrating transfer of a packet from a packet buffer to a bus interface for delivery to one or more functions operating on a host, according to some embodiments of the invention.

FIG. 3 is a flow chart demonstrating transfer of a packet from a packet buffer to a bus interface for delivery to one or more functions operating on a host, according to some embodiments of the invention.

In operation 302, a packet is stored in the packet buffer. Methods of processing packets for storage in packet buffers, and for storing corresponding control headers, are described above.

In operation 304, the control header for a packet at the head of the buffer is moved to a header buffer (e.g., header buffer 232 of FIG. 2), and is examined (e.g., by a DMA scheduler). The control header may contain information such as the length of the packet, classification, attributes and so on, and may be used to make a preliminary determination whether to drop the packet.

For example, the packet may have been stored in the buffer even if contained an error. The control header will indicate the error, and a decision may be made (e.g., by the DMA scheduler) to drop the packet. The control header may also be examined to determine whether it contains any errors.

In operation 306, if the packet is to be dropped, it is dropped from the buffer (e.g., by moving a read pointer past it) and the method returns to operation 304 to read the next control header. If copying of the packet into the data pipeline already began before a decision is made to drop it, the pipeline may be cleaned up by moving a write pointer.

If the packet is not to be dropped, the method advances to operations 310 and 330, which represent the parallel manner in which a packet is speculatively moved forward within a data pipeline while responsible DMAs perform their processing and populate a control pipeline.

In some embodiments of the invention, after one control header is read and processed, the next one may be copied into the header buffer for processing even if its corresponding data packet is not yet at the head of the buffer.

In operation 310, the control header (or data extracted from the control header) is passed to all DMA contexts, or at least those DMAs identified in the control header.

In operation 312, for every destination function of the packet, a corresponding DMA context signals the DMA scheduler with a preliminary determination as to whether or not it can accept the packet. The DMAs may make this decision based on their current states and/or information in the control header. For example, if no host descriptors are available for a particular DMA, that DMA will signal that it must drop the packet. Note that if all DMAs signal that the packet should be dropped, the packet will be purged as described above in conjunction with operation 306.

In operation 314, each responsible DMA performs its necessary processing to facilitate the transfer. This may involve identifying the necessary number of host buffers, calculating a destination address for the transfer, etc.

In operation 316, the DMAs (e.g., via the DMA scheduler) populate control tags in the control pipeline, in sync with the packet. More particularly, and as described below, for each copy of a packet placed in the data pipeline (e.g., one for each destination function), a separate control tag is placed in the control pipeline. When the DMA corresponding to a particular packet releases its control tag, the packet is considered ready for transfer.

Control tags may be pre-populated with some information (e.g., packet length, destination function), and initially stored in the control pipeline by the DMA scheduler, and will be configured with other information (e.g., destination host memory address) by a DMA engine when it completes its work.

After operation 316, when all responsible DMAs have either completed their processing and configured a control tag for their packet or have signaled that the packet (or their copy of the packet) should be dropped, the illustrated method advances to operation 350.

In operation 330, operating in parallel with operations 310-316, one copy of the packet is speculatively moved to the data pipeline for each host function that is to receive the packet. In particular, for each destination function (which may be determined by reading the control header), a separate copy of the packet is read into the data pipeline. When the last copy has been successfully placed, the buffer may be informed that reading is complete; the buffer can therefore advance its read pointer.

In operation 332, if a reject signal is received from a DMA context or on behalf of a host (e.g., from host interface logic), transfer of the packet is aborted. As described below, rejection or error may be signaled anytime before or during transfer of a packet to the host.

In operation 350, if no fatal errors have been signaled, the packet and control information (i.e., the control tags) are presented to the host interface logic. Before releasing the packet, it may be aligned or padded as necessary to facilitate transfer. As mentioned previously, to reduce the handshaking overhead, the packet may be presented to the bus interface in synchronization with a request to accept the packet.

Even while transferring the packet, an error may occur that requires the packet to be dropped. For example, it may be determined that a destination function has been reset or is otherwise unavailable. In this event, the data will be flushed.

After the packet has been transferred, the method may end or may return to operation 304 to process the next packet in the packet buffer. Note, however, that the control header for the packet subsequent to the packet transferred in operation 350 may be read even before the transfer is complete.

Embodiments of the invention are configured to provide isolation or separation between different hosts and between different functions on one host. This isolation prevents issues with one host or function from affecting another, such as: reset or shutdown of a function (e.g., a Function Level Reset), disablement of a function (e.g., as specified by the PCIe protocol), detection of an error by a host assembly or by a host, etc.

Thus, errors associated with or occurring during transfer of a packet may be reported by either the destination host (or function) or a host assembly transferring a packet to the host.

A recipient (e.g., a host bus interface) may issue a reject signal or otherwise report a fatal error, but in some embodiments of the invention may continue to continue reading or accepting the data, while discarding it. The DMA engine responsible for transferring the packet will flush any residual data or information without affecting any other DMA engine or function.

In the case of detection of an internal error (i.e., within the communication device), such as a parity error, an ECC error or a software error, the DMA engine requesting the transfer of a packet issues a reject signal to abort the packet transfer. The host interface logic will drop the request and discard any packet data that it may have already received. As with an externally detected error, no other functions or DMA engines are affected.

In some embodiments, when an error (or a particular type of error) is reported for a given function, the host assembly may drop one or more other packets it possesses or subsequently receives that are bound for that function. For example, if a host bus interface rejects a packet because the destination function is no longer available, other packets buffered for that same function will be discarded. As such packets are detected in the buffer, they will be dropped. The DMA engine(s) bound to that function will thus be shut down until the error is corrected or until bound to a valid function.

In some embodiments of the invention, one of the attributes that are associated with a packet during its preparation for transfer and for the actual transfer to a host is a "type" attribute that indicates whether the packet is good or bad. If an error is received, the attribute is set to bad to signal the host and the host assembly that the transfer has failed.

Thus, a DMA can continue its work without blocking on one particular packet and, in addition, an error with one packet or with one destination function does not block the transfer of other packets or transfers to other destination functions.

Figure 4:
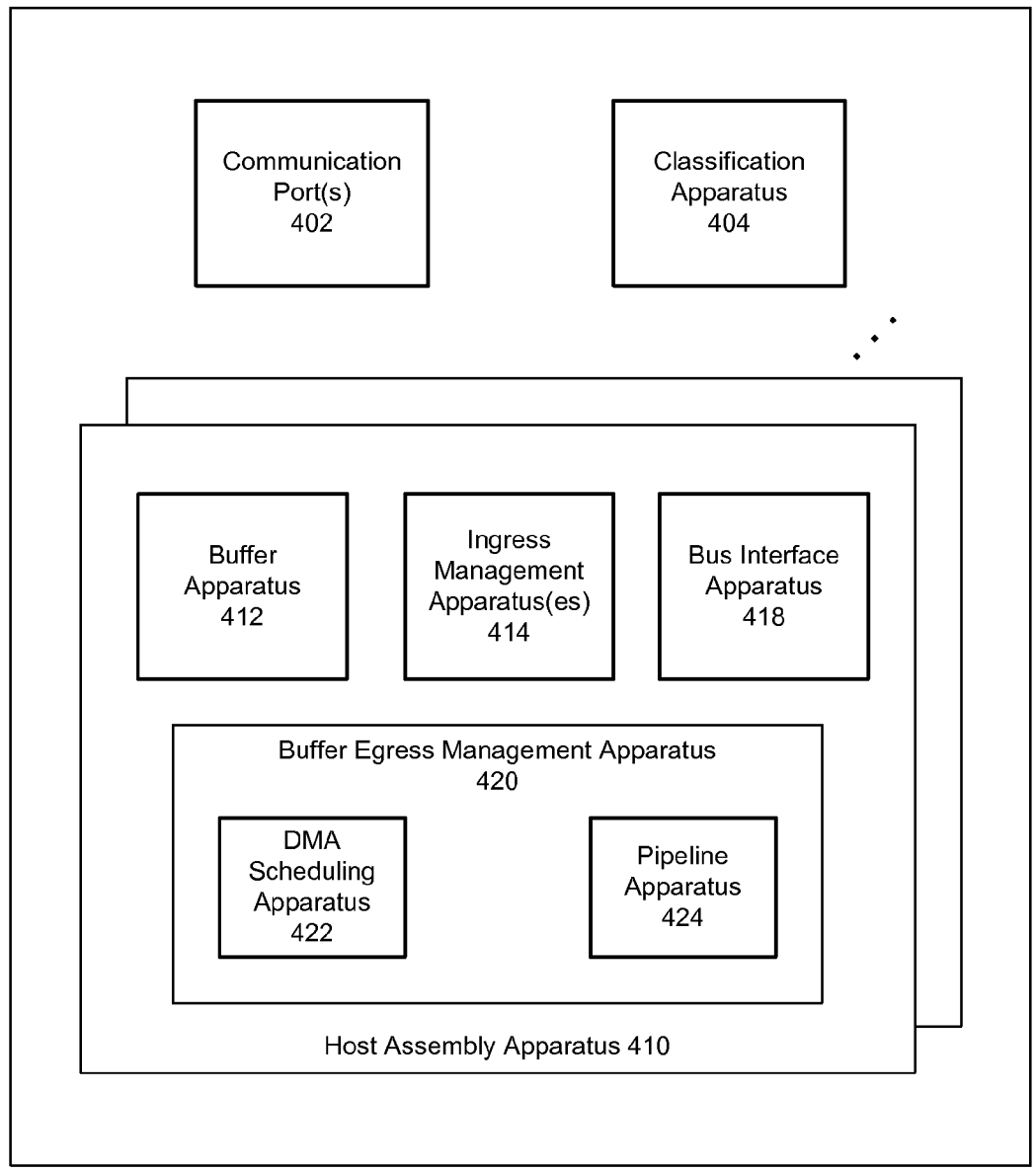
FIG. 4 is a block diagram of a communication apparatus that can be shared among multiple hosts and functions through virtualization of its ports, according to some embodiments of the invention.

FIG. 4 is a block diagram of a communication apparatus that can be shared among multiple hosts and functions through virtualization of one or more ports, according to some embodiments of the invention.

Communication apparatus 400 of FIG. 4 comprises one or more communication ports 402 for receiving packets, frames, datagrams, cells or other communications from networks or other communication links. Apparatus 400 also includes classification apparatus 404 and one or more host assembly apparatuses 410. Each host assembly apparatus comprises buffer apparatus 412, one or more buffer ingress management apparatuses 414, bus interface apparatus 318 and buffer egress management apparatus 420. Each host assembly apparatus 410 is allocated to a single host, but can be dynamically reallocated to a different host, and multiple host assembly apparatuses may be concurrently allocated to the same host.

Classification apparatus 404 is adapted to classify a communication received at apparatus 400 to identify a physical or virtual function to which the communication is directed. To classify the communication, apparatus 404 may examine its contents (e.g., protocol headers, payload) and compare those contents to entries stored in one or more classification tables to identify a flow or connection to which the communication belongs. Apparatus 404 may also identify a function corresponding to the flow, select one or more DMA engines for transferring the communication to one or more functions, and/or perform other tasks to help direct the packet's data to its destination(s).

Each buffer apparatus 412 is adapted to store packets for transfer to its destination host and functions, along with separate control headers for each packet.

Access to each buffer apparatus is managed by a set of buffer ingress management apparatuses 414. As described above, for each function supported by the buffer, a separate buffer ingress management apparatus may be instantiated or activated to serve that function. The buffer ingress management apparatuses are adapted to apply dynamically programmable criteria to filter packets received from classification apparatus 404, so as to allow only packets desired by their corresponding functions to be stored in their associated buffer apparatus 412.

Departure of packet data from each buffer apparatus is managed by buffer egress management apparatus 420, which comprises DMA scheduling apparatus 422 and pipeline apparatus 424. The buffer egress management apparatuses are adapted to process each set of packet data according to control information stored in the buffer apparatus with the packet data. The control information may identify which host/function to transfer the packet data to, how to perform the transfer (e.g., which DMA engine, which bus interface logic), why the packet was accepted by the host assembly apparatus 410, etc.

More specifically, DMA scheduling apparatus comprises multiple DMA engines/contexts, each of which is bound to a function hosted by the host corresponding to the host assembly apparatus 410. Those DMAs prepare packets for transfer to their functions and populate a control portion of pipeline 424 with information consumed by the bus interface apparatus to perform a packet transfer.

Pipeline 424 also comprises a data portion into which a packet is speculatively copied (once for each destination function) while the DMA engines operating on behalf of the destination function or functions perform their processing to facilitate the packet's transfer.

Bus or host interface logic 418 is adapted to configure a packet for transmission to the destination host via the appropriate physical media.

The environment in which a present embodiment of the invention is executed may incorporate a general-purpose computer or a special-purpose device such as a hand-held computer or a computer server. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An input/output device for simultaneously supporting multiple hosts and multiple functions, the input/output device comprising:
    a communication port through which the input/output device receives communications for the multiple hosts and multiple functions; and
    a plurality of host assemblies, each host assembly supporting a single host and comprising:
    a buffer configured to store:
    packets addressed to a plurality of functions hosted by the single host; and
    for each of the packets, a corresponding classification control header comprising classification control information; and
    an egress manager comprising;
    multiple DMA (Direct Memory Access) contexts configured to generate transfer control information for facilitating transfer of the packets to the plurality of functions; and
    a pipeline configured to speculatively receive the packets from the buffer while said DMA contexts generate said transfer control information, wherein said pipeline comprises a control pipe configured to receive the transfer control information.

2. The input/output device of claim 1, wherein said egress manager further comprises:
    a DMA scheduler configured to distribute the classification control information to a subset of said DMA contexts.

3. The input/output device of claim 2, wherein said egress manager further comprises:
    a header buffer configured to receive the classification control header before a corresponding packet is speculatively received into said pipeline from the buffer.

4. The input/output device of claim 1, wherein said pipeline further comprises:
    a data pipe configured to speculatively receive the packets.

5. The input/output device of claim 4, wherein:
for each of the packets, the data pipe receives one copy of the packet for each function in the plurality of functions to which the packet is addressed.

6. The input/output device of claim 1, wherein:
the transfer control information is stored in the control pipe in the form of control tags; and
each said control tag is configured to identify a destination address of the packet.

7. The input/output device of claim 4, wherein:
each packet is speculatively received into said data pipe before corresponding transfer control information is received into said control pipe.

8. The input/output device of claim 1, further comprising:
a first signal connection between the egress manager and the buffer, actuable to read a first packet from a head of the buffer.

9. The input/output device of claim 8, further comprising:
a second signal connection between the egress manager and the buffer, actuable to confirm completion of reading of the first packet.

10. The input/output device of claim 1, wherein all packets addressed to any function hosted by the single host are stored in the buffer.

11. The input/output device of claim 10, wherein all said packets addressed to any function hosted by the single host are speculatively received in the pipeline before transfer to the single host.

12. A method of operating an input/output device to simultaneously support multiple hosts and multiple functions, the method comprising:
classifying a packet received through a port of the input/output device configured to receive communications for the multiple hosts and the multiple functions;
at one or more host assemblies, wherein each host assembly is allocated to one of the multiple hosts:
storing in a host assembly buffer the packet and an associated classification control header containing packet classification information;
reading the control header into a control header buffer;
distributing the packet classification information to one or more DMA (Direct Memory Access) contexts; and
speculatively copying the packet from the host assembly buffer, for transfer to the one host, before a destination address for the packet is determined by the one or more DMA contexts, wherein each DMA context is bound to one function hosted by the one host.

13. The method of claim 12, further comprising:
receiving from each of the DMA contexts a preliminary signal indicating whether or not the packet may be transferred to the one function.

14. The method of claim 12, further comprising:
receiving from each of the DMA contexts, after said speculatively copying, a host destination address at which to store the packet.

15. The method of claim 12, further comprising:
commencing transfer of the packet to the one host.

16. The method of claim 15, further comprising:
receiving a reject signal during transfer of the packet to an address corresponding to a first function; and
automatically dropping one or more subsequent packets addressed to the first function.

17. The method of claim 16, further comprising:
detecting an error within the host assembly during transfer of the packet; and signaling to the host to drop the packet.

18. A non-transitory processor-readable medium storing instructions that, when executed by a processor, cause the processor to perform a method of operating an input/output device to simultaneously support multiple hosts and multiple functions, the method comprising:
classifying a packet received through a port of the input/output device configured to receive communications for the multiple hosts and the multiple functions;
at one or more host assemblies, wherein each host assembly is allocated to one of the multiple hosts:
storing in a host assembly buffer the packet and an associated classification control header containing packet classification information;
reading the control header into a control header buffer;
distributing the packet classification information to one or more DMA (Direct Memory Access) contexts; and
speculatively copying the packet from the host assembly buffer, for transfer to the one host, before a destination address for the packet is determined by the one or more DMA contexts, wherein each DMA context is bound to one function hosted by the one host.

* * * * *